(12) United States Patent
Zhang

(10) Patent No.: US 10,568,113 B2
(45) Date of Patent: Feb. 18, 2020

(54) METHOD AND DEVICE IN UE AND BASE STATION USED FOR WIRELESS COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/059,045

(22) Filed: Aug. 9, 2018

(65) Prior Publication Data

US 2019/0053258 A1    Feb. 14, 2019

(30) Foreign Application Priority Data

Aug. 11, 2017    (CN) .......................... 2017 1 0686330

(51) Int. Cl.
| | |
|---|---|
| *H04W 72/12* | (2009.01) |
| *H04L 1/16* | (2006.01) |
| *H04L 1/18* | (2006.01) |
| *H04W 24/10* | (2009.01) |
| *H04L 5/00* | (2006.01) |
| *H04B 7/0413* | (2017.01) |

(52) U.S. Cl.
CPC ...... *H04W 72/1215* (2013.01); *H04B 7/0413* (2013.01); *H04L 1/1657* (2013.01); *H04L 1/1861* (2013.01); *H04L 5/0023* (2013.01); *H04L 5/0053* (2013.01); *H04L 5/0055* (2013.01); *H04L 5/0082* (2013.01); *H04L 5/0094* (2013.01); *H04W 24/10* (2013.01); *H04L 5/0048* (2013.01)

(58) Field of Classification Search
CPC .............. H04W 72/1215; H04W 24/10; H04B 7/0413; H04L 1/1861; H04L 5/0055; H04L 1/1657

See application file for complete search history.

(56) References Cited

U.S. PATENT DOCUMENTS

| | | | |
|---|---|---|---|
| 2013/0034071 A1* | 2/2013 | Lee ................... | H04W 74/0866 370/329 |
| 2013/0155990 A1* | 6/2013 | Nishio ................. | H04L 5/0053 370/329 |

(Continued)

*Primary Examiner* — Will W Lin
(74) *Attorney, Agent, or Firm* — Maschoff Brennan

(57) ABSTRACT

A UE receives a target radio signal, transmits a first radio signal on a first channel, transmits a second radio signal on a second channel, and monitors a third radio signal in a first time window. A measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window. The application of the present disclosure can make full use of the allocated aerial resources, and improve the utilization of the aerial resources configured to transmit a report request that is determined autonomously by the UE.

20 Claims, 9 Drawing Sheets

(56) References Cited

U.S. PATENT DOCUMENTS

| | | | |
|---|---|---|---|
| 2013/0163537 A1* | 6/2013 | Anderson | H04W 72/1284 |
| | | | 370/329 |
| 2014/0036881 A1* | 2/2014 | Kim | H04L 5/001 |
| | | | 370/336 |
| 2014/0247796 A1* | 9/2014 | Ouchi | H04L 5/0053 |
| | | | 370/329 |
| 2017/0331670 A1* | 11/2017 | Parkvall | H04W 52/0274 |
| 2018/0049164 A1* | 2/2018 | Wu | H04W 72/042 |
| 2018/0092085 A1* | 3/2018 | Shaheen | H04W 28/08 |

* cited by examiner

METHOD AND DEVICE IN UE AND BASE STATION USED FOR WIRELESS COMMUNICATION

CROSS REFERENCE TO RELATED APPLICATION

This application claims the priority benefit of Chinese Patent Application Serial Number 201710686330.4, filed on Aug. 11, 2017, the full disclosure of which is incorporated herein by reference.

BACKGROUD

Technical Field

The present disclosure relates to transmission schemes of radio signals in wireless communication systems, and in particular to a method and a device for a User Equipment (UE) to autonomously determine transmission of information.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication.

In 3rd Generation Partner Project (3GPP) New Radio discussion, there is some company proposing that a UE should conduct a measurement on a service beam during the communication process and that, when the quality of the service beam is found degraded, a Physical Uplink Control Channel (PUCCH) and a Physical Random Access Channel (PRACH) like contention-free channel should be used by the UE to transmit a beam recovery request to a base station, which then changes the service beam.

SUMMARY

The inventor finds through researches that: if a UE, after using one channel to transmit a beam recovery request, cannot transmit the beam recovery request again during the time window of waiting a response, then a time-frequency resource configured within the time window of waiting the response to transmit a beam recovery request cannot be used by the UE to transmit a beam recovery request, which consequently results in a low utilization of the time-frequency resource configured for transmitting the beam recovery request.

In view of the above problems, the present disclosure provides a solution. It should be noted that the embodiments of the present disclosure and the characteristics in the embodiments may be mutually combined if no conflict is caused. For example, the embodiments of the UE of the present disclosure and the characteristics in the embodiments may be applied to the base station, and vice versa.

The present disclosure provides a method in a UE for wireless communication. The method includes the following steps of:

receiving a target radio signal;
transmitting a first radio signal on a first channel;
transmitting a second radio signal on a second channel; and
monitoring a third radio signal in a first time window.

Herein, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the above method is advantageous in improving the utilization of the aerial resources configured to transmit a report request that is determined autonomously by the UE.

In one embodiment, the target radio signal is transmitted on a physical layer control channel (that is, a physical layer channel capable of transmitting control information only).

In one embodiment, the target radio signal carries Downlink Control Information (DCI).

In one embodiment, the target radio signal is transmitted on a physical layer data channel (that is, a physical layer channel capable of transmitting data information only) or a physical layer shared channel (that is, a physical layer channel used for transmitting data or control information).

In one embodiment, the target radio signal is a reference signal.

In one embodiment, the target radio signal is a Demodulation Reference Signal (DMRS) of a physical layer control channel.

In one embodiment, the target radio signal is a DMRS of a physical layer shared channel.

In one embodiment, the target radio signal is a Channel State Information Reference Signal (CSI-RS) used for conducting a channel quality measurement of a physical layer control channel.

In one embodiment, the target radio signal is a Synchronization Signal (SS) used for conducting a channel quality measurement of a physical layer control channel.

In one embodiment, the multi-antenna related transmitting of a physical layer control channel is related to the multi-antenna related transmitting of the target radio signal.

In one embodiment, an antenna port used for transmitting a physical layer control channel is spatially related to an antenna port used for transmitting the target radio signal.

In one embodiment, an antenna port used for transmitting a physical layer control channel is spatially Quasi Co-Located (QCL) with an antenna port used for transmitting the target radio signal.

In one embodiment, an analog transmitting beam used for transmitting a physical layer control channel is used for transmitting the target radio signal.

In one embodiment, an analog receiving beam used for receiving a physical layer control channel is used for receiving the target radio signal.

In one embodiment, the multi-antenna related transmitting of a physical layer shared channel is related to the multi-antenna related transmitting of the target radio signal.

In one embodiment, an antenna port used for transmitting a physical layer shared channel is spatially Quasi Co-Located (QCL) with an antenna port used for transmitting the target radio signal.

In one embodiment, an analog transmitting beam used for transmitting a physical layer shared channel is used for transmitting the target radio signal.

In one embodiment, an analog receiving beam used for receiving a physical layer shared channel is used for receiving the target radio signal.

In one embodiment, the being spatially related refers to using the same analog beam to transmit signaling or data.

In one embodiment, the being spatially related refers to being QCL.

In one embodiment, the being spatially related refers to being spatially QCL.

In one embodiment, the being spatially related refers that channel characteristics are the same or similar.

In one embodiment, the being spatially related refers that at least one of {Delay Spread, Doppler Spread, Doppler Shift, average of Angle of Arrival (AoA), and average of Angle of Departure (AoD)} is the same or similar. The being similar refers that the difference between the two is less than a first threshold.

In one subembodiment, the first threshold is default.

In one subembodiment, the first threshold is preconfigured.

In one subembodiment, the first threshold is configured by a base station.

In one embodiment, the analog beam refers to a beam formed when a beamforming vector is applied to a phase shifter at the radio frequency part of equipment.

In one embodiment, the analog beam is formed when an analog beamforming vector is applied to on an analog device.

In one embodiment, the antenna port is formed by multiple physical antennas through antenna virtualization superposition. A mapping coefficient of the antenna port to the multiple physical antennas constitutes a beamforming vector, which is applied to the antenna virtualization to form a beam.

In one embodiment, one antenna port is used for transmitting one reference signal.

In one embodiment, different antenna ports are used for transmitting different reference signals.

In one embodiment, a physical layer control channel is used for transmitting the first radio signal.

In one embodiment, the first radio signal carries Uplink Control Information (UCI).

In one embodiment, Forward Error Correction (FEC) is used in generating the first radio signal.

In one embodiment, the first radio signal is used for determining a beam recovery request.

In one embodiment, the first radio signal is used for determining that an antenna port used for transmitting the third radio signal is spatially unrelated to an antenna port used for transmitting the target radio signal.

In one embodiment, the being spatially unrelated refers to being not QCL spatially.

In one embodiment, the being spatially unrelated refers to using different analog beams.

In one embodiment, the being spatially unrelated refers that at least one of {Delay Spread, Doppler Spread, Doppler Shift, average of Angle of Arrival (AoA), and average of Angle of Departure (AoD)} is not similar. The being not similar refers that the difference between the two is higher than a second threshold.

In one subembodiment, the second threshold is default.

In one subembodiment, the second threshold is preconfigured.

In one subembodiment, the second threshold is configured by a base station.

In one embodiment, a first bit block generates the first radio signal through FEC, and the value of the first bit block is used for determining the multi-antenna related transmitting of the third radio signal.

In one embodiment, a physical layer control channel is used for transmitting the second radio signal.

In one embodiment, the second radio signal carries one UCI.

In one embodiment, a first signature sequence is used for generating the second radio signal, and at least one of {the sequence number of the first signature sequence in Q signature sequences, a frequency domain resource occupied by the first signature sequence, a time domain resource occupied by the first signature sequence} is used for determining the multi-antenna related transmitting of the third radio signal.

In one embodiment, the second radio signal is a preamble.

In one embodiment, FEC is not used in generating the second radio signal.

In one embodiment, the second radio signal is not transmitted on a physical layer control channel.

In one embodiment, a physical layer channel used for transmitting the second radio signal has higher reliability than a physical layer channel used for transmitting the first radio signal.

In one embodiment, a physical layer control channel is used for transmitting the third radio signal.

In one embodiment, the third radio signal carries one DCI.

In one embodiment, the third radio signal is terminal specific.

In one embodiment, the first radio signal is used for determining a first antenna port group, and the first antenna port group is spatially related to an antenna port group used for transmitting the third radio signal.

In one embodiment, the antenna port group includes one antenna port only.

In one embodiment, the antenna port group includes multiple antenna ports.

In one embodiment, the first radio signal is used for determining a first antenna port group.

In one subembodiment, an analog transmitting beam used for the first antenna port group is used for transmitting the third radio signal.

In one subembodiment, an analog receiving beam used for receiving the first antenna port group is used for monitoring the third radio signal.

In one embodiment, the second radio signal is used for determining a second antenna port group.

In one subembodiment, an analog transmitting beam used for the second antenna port group is used for transmitting the third radio signal.

In one subembodiment, an analog receiving beam used for receiving the second antenna port group is used for monitoring the third radio signal.

In one embodiment, the monitoring refers to blind decoding.

In one embodiment, the monitoring refers that, before successful decoding, it is not determined whether the third radio signal is transmitted.

In one embodiment, the monitoring refers that, before successful detection, it is not determined whether the third radio signal is transmitted.

In one embodiment, the UE monitors the third radio signal on the physical layer control channel in the first time window.

In one embodiment, a measurement for the target radio signal obtains a target measurement value.

In one subembodiment, the target measurement value, when less than a target threshold, is used for triggering the transmission of the first radio signal and the second radio signal.

In one subembodiment, the target measurement value is at least one of {Reference Signal Receiver Power (RSRP), Signal-to-Noise Ratio (SNR), Signal-to-Interference-plus-Noise Ratio (SINR)} that are obtained by a measurement of the target radio signal.

In one subembodiment, the target measurement value is at least one of {equivalent Reference Signal Receiver Power (RSRP), equivalent SNR, equivalent SINR} that are obtained when the target radio signal is mapped to a physical layer control channel.

In one subembodiment, the target measurement value, when higher than a target threshold, is used for triggering the transmission of the first radio signal. The target measurement value refers to at least one of {Bit Error Rate (BER), Block Error Rate (BLER)} that are obtained when the target radio signal is mapped to a physical layer control channel.

In one subembodiment, the target measurement value is used for determining the quality of the channel through which the target radio signal passes.

In one subembodiment, the target measurement value is used for determining the channel quality of a physical layer control channel corresponding to the target radio signal.

In one embodiment, a time resource occupied by the second radio signal is before the start time of the first time window.

In one embodiment, a time resource occupied by the second radio signal is behind the start time of the first time window.

In one embodiment, the offset between the start time of the first time window and the time domain resource occupied by the first radio signal is preconfigured.

In one embodiment, the offset between the start time of the first time window and the time domain resource occupied by the first radio signal is configured by default.

In one embodiment, the offset between the start time of the first time window and the time domain resource occupied by the first radio signal is configured by a base station.

In one embodiment, the offset between the end time of the first time window and the time domain resource occupied by the first radio signal is preconfigured.

In one embodiment, the offset between the end time of the first time window and the time domain resource occupied by the first radio signal is configured by default.

In one embodiment, the offset between the end time of the first time window and the time domain resource occupied by the first radio signal is configured by a base station.

In one embodiment, the time interval between the first radio signal and the second radio signal in time domain is used for determining the length of the first time window.

According to one aspect of the present disclosure, the above method is characterized in that: at least one of {the first radio signal, the second radio signal} is used for determining the multi-antenna related transmitting of the third radio signal.

In one embodiment, at least one of {the first radio signal, the second radio signal} is related to the multi-antenna related receiving of the third radio signal.

In one embodiment, the first radio signal and the second radio signal both carry second information, and the second information is used for determining the multi-antenna related transmitting of the third radio signal.

In one subembodiment, the second information is used for determining an analog transmitting beam used for transmitting the third radio signal.

In one subembodiment, the second information is used for determining a first antenna port group. The first antenna port group is spatially related to an antenna port group used for transmitting the third radio signal.

In one subembodiment, the second information is used for determining a first antenna port group. The first antenna port group is spatially QCL with an antenna port used for transmitting the third radio signal.

In one subembodiment, the second information is used for determining a first antenna port group. An analog transmitting beam used for the first antenna port group is used for transmitting the third radio signal.

In one subembodiment, the second information is related to the multi-antenna related receiving of the third radio signal.

In one subembodiment, the second information is used for determining a first antenna port group. A receiving beam used for receiving the first antenna port group is used for monitoring the third radio signal in the first time window.

In one embodiment, a first time interval refers to a time interval between a time domain resource occupied by the first radio signal and a time domain resource occupied by the second radio signal.

In one subembodiment, the first radio signal is used for determining the multi-antenna related transmitting of the third radio signal in the first time interval.

In one subembodiment, the first radio signal is related to the multi-antenna related receiving used for monitoring the third radio signal in the first time interval.

In one subembodiment, the UE does not detect the third radio signal in the first time interval.

In one embodiment, a time domain resource occupied by the second radio signal is within the first time window.

In one embodiment, the first time window is divided into a second time interval and a third time interval. The first radio signal is used for determining the multi-antenna related transmitting of the third radio signal in the second time interval. The second radio signal is used for determining the multi-antenna related transmitting of the third radio signal in the third time interval. The second time interval is before the third time interval. The third time interval is behind a time domain resource occupied by the second radio signal.

In one subembodiment, the start time of the second time interval is the start time of the first time window.

In one subembodiment, the end time of the third time interval is the end time of the first time window.

In one subembodiment, the end time of the second time interval is the start time of the third time interval.

In one subembodiment, the end time of the second time interval is a time domain resource occupied by the second radio signal.

In one subembodiment, the end time of the second time interval is before a time domain resource occupied by the second radio signal.

In one subembodiment, the end time of the second time interval is behind a time domain resource occupied by the second radio signal.

In one subembodiment, the first radio signal is related to the multi-antenna related receiving of the third radio signal in the second time interval, and the second radio signal is related to the multi-antenna related receiving of the third radio signal in the third time interval.

In one subembodiment, the first radio signal is used for determining a second antenna port group, and the second antenna port group is spatially related to an antenna port group used for transmitting the third radio signal in the second time interval.

In one subembodiment, the first radio signal is used for determining a second antenna port group; in the second time interval, the second antenna port group is spatially QCL with an antenna port group used for transmitting the third radio signal in the second time interval.

In one subembodiment, the first radio signal is used for determining a second antenna port group; in the second time interval, an analog transmitting beam used for the second antenna port group is used for transmitting the third radio signal in the second time interval.

In one subembodiment, the first radio signal is used for determining a second antenna port group; in the second time interval, an analog receiving beam used for the second antenna port group is used for receiving the third radio signal in the second time interval.

In one subembodiment, the second radio signal is used for determining a third antenna port group, and the third antenna port group is spatially related to an antenna port group used for transmitting the third radio signal in the third time interval.

In one subembodiment, the second radio signal is used for determining a third antenna port group; in the third time interval, the third antenna port group is spatially QCL with an antenna port group used for transmitting the third radio signal in the third time interval.

In one subembodiment, the second radio signal is used for determining a third antenna port group; in the third time interval, an analog transmitting beam used for the third antenna port group is used for transmitting the third radio signal in the third time interval.

In one subembodiment, the second radio signal is used for determining a third antenna port group; in the third time interval, an analog receiving beam used for the third antenna port group is used for receiving the third radio signal in the third time interval.

In one embodiment, the multi-antenna related transmitting refers to a transmitting beam.

In one embodiment, the multi-antenna related transmitting refers to an analog transmitting beam.

In one embodiment, the multi-antenna related receiving refers to a receiving beam.

In one embodiment, the multi-antenna related receiving refers to an analog receiving beam.

According to one aspect of the present disclosure, the method is characterize in that: the first radio signal and the second radio signal together are used for determining the multi-antenna related transmitting of the third radio signal In one embodiment, the above method is advantageous in making full use of aerial resources to report more information.

In one embodiment, the first radio signal and the second radio signal together are used for determining an analog transmitting beam used for transmitting the third radio signal.

In one embodiment, the first radio signal and the second radio signal together are used for determining a fourth antenna port group. The fourth antenna port group is spatially related to an antenna port group used for transmitting the third radio signal.

In one subembodiment, an analog transmitting beam used for the fourth antenna port group is used for transmitting the third radio signal.

In one subembodiment, a receiving beam used for receiving the fourth antenna port group is used for receiving the third radio signal.

In one subembodiment, the first radio signal and the second radio signal together are used for determining the index value of the fourth antenna port group in K antenna port groups, wherein K is positive integer greater than 1.

In one subembodiment, the first radio signal and the second radio signal are used for determining the values of different bit positions in a first bit block respectively, and the value of the first bit block is equal to the index value of the fourth antenna port group in K antenna port groups, wherein K is positive integer greater than 1.

According to one aspect of the present disclosure, the first channel is a first type of physical layer channel, the second channel is a second type of physical layer channel, and the first type of physical layer channel and the second type of physical layer channel are two different types of physical layer channels.

In one embodiment, the above method is advantageous in that different types of physical layer channels are used to report user requests and the diversity effect is increased.

In one embodiment, the first type of physical layer channel is a physical layer control channel.

In one embodiment, the second type of physical layer channel is a physical layer random access channel.

In one embodiment, the second type of physical layer channel is a contention-free physical layer random access channel.

In one embodiment, information transmitted on the first type of physical layer channel is subjected to FEC.

In one embodiment, information transmitted on the second type of physical layer channel is not subjected to FEC.

In one embodiment, to transmit the information about the multi-antenna related transmitting of the third radio signal, the second type of physical layer channel has higher reliability than the first type of physical layer channel.

In one embodiment, a time-frequency resource occupied by the first type of physical layer channel is dynamically configured.

In one embodiment, a time-frequency resource occupied by the second type of physical layer channel is statically or semi-statically configured.

In one embodiment, a time-frequency resource occupied by the first type of physical layer channel is configured by physical layer control information.

In one embodiment, a time-frequency resource occupied by the second type of physical layer channel is configured by a higher layer signaling.

In one embodiment, a time-frequency resource occupied by the second type of physical layer channel is configured by a Radio Resource Control (RRC) signaling.

According to one aspect of the present disclosure, the above method is characterized in that: the first channel is a physical layer control channel.

In one embodiment, the first radio signal is used for not only determining the multi-antenna related transmitting of the third radio signal, but also determining at least one of {Scheduling Request (SR), Hybrid Automatic Repeat Request-Acknowledgement (HARQ/ACK), Precoding Matrix Indicator (PMI), Channel Quality Indicator (CQI), Rank Indicator (RI), Beam Recovery Request, CSI-RS Resource Indicator (CRI)}.

In one embodiment, the first channel is a PUCCH.

In one embodiment, the first channel is a Short PUCCH (sPUCCH).

In one embodiment, the second channel is also a physical layer control channel.

In one embodiment, the second channel is not a physical layer control channel.

In one embodiment, the second channel is a physical layer random access channel.

In one embodiment, the second channel is a contention-free physical layer random access channel.

In one embodiment, the multi-antenna related transmitting used for the first channel and the multi-antenna related transmitting used for the second channel are different.

According to one aspect of the present disclosure, the above method is characterized in that: a time domain resource occupied by the first radio signal is used for determining a second time window, a time domain resource occupied by the second radio signal is within the second time window, and the second time window is within the first time window.

In one embodiment, a time domain resource occupied the first radio signal is used for determining the start time of a second time window.

In one embodiment, the start time of the second time window is equal to the time domain resource occupied the first radio signal plus a second offset.

In one subembodiment, the second offset is configured by default.

In one subembodiment, the second offset is preconfigured.

In one subembodiment, the second offset is configured by a base station.

In one embodiment, the start time of the second time window and the start time of the first time window are the same.

In one embodiment, the length of the second time window is configured by default.

In one embodiment, the length of the second time window is preconfigured.

In one embodiment, the length of the second time window is configured by a base station.

In one embodiment, a time domain resource occupied by the second radio signal is a time domain resource in a first time domain resource pool.

In one subembodiment, the first time domain resource pool is configured by a higher layer.

In one subembodiment, the first time domain resource pool is configured by an RRC signaling.

According to one aspect of the present disclosure, the above method is characterized in that: a time domain resource occupied by the second radio signal is used for determining a third time window, and the end time of the third time window is the end time of the first time window.

In one embodiment, a time domain resource occupied by the second radio signal is used for determining the start time of a third time window.

In one embodiment, the start time of the third time window is equal to the time domain resource occupied by the second radio signal plus a third offset.

In one subembodiment, the third offset is configured by default.

In one subembodiment, the third offset is preconfigured.

In one subembodiment, the third offset is configured by a base station.

In one embodiment, the second time window and the third time window are used for determining the first time window.

In one embodiment, the length of the first time window is equal to the time interval between the start time of the second time window and the time domain resource on which the second radio signal is located plus the time interval between the time domain resource on which the second radio signal is located and the end time of the third time window.

In one embodiment, the end time of the third time window and the end time of the first time window are the same.

In one embodiment, the length of the third time window is configured by default.

In one embodiment, the length of the third time window is preconfigured.

In one embodiment, the length of the third time window is configured by a base station.

In one embodiment, a second time interval refers to a time interval from the start time of the first time window to the start time of the third time window, and the first radio signal is used for the multi-antenna related transmitting of the third radio signal in the second time interval.

In one subembodiment, the first time window consists of the second time interval and the third time window.

In one embodiment, the first radio signal is used for determining a first antenna port group. An analog transmitting beam used for the first antenna port group is used for transmitting the third radio signal in the second time interval.

In one embodiment, the first radio signal is used for determining a first antenna port group. An analog receiving beam used for the first antenna port group is used for monitoring the third radio signal in the second time interval.

In one embodiment, the second radio signal is used for determining the multi-antenna related transmitting of the third radio signal in the third time window.

In one embodiment, the second radio signal is used for determining a second antenna port group. An analog transmitting beam used for the second antenna port group is used for transmitting the third radio signal in the third time window.

In one embodiment, the second radio signal is used for determining a second antenna port group. An analog receiving beam used for the second antenna port group is used for monitoring the third radio signal in the third time window.

The present disclosure provides a method in a base station device for wireless communication. The method includes the following steps of:

transmitting a target radio signal;
receiving a first radio signal on a first channel;
receiving a second radio signal on a second channel; and
transmitting a third radio signal in a first time window.

Herein, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the third radio signal is not a response to the first radio signal, but a response to the second radio signal.

In one subembodiment, the base station device does not receive the first radio signal correctly, but receives the second radio signal correctly.

In one subembodiment, the base station device receives the first radio signal and the second radio signal correctly in sequence.

In one subembodiment, the first radio signal is not used for determining the multi-antenna related transmitting of the third radio signal, but the second radio signal is used for determining the multi-antenna related transmitting of the third radio signal.

In one embodiment, the base station device receives the first radio signal and the second radio signal correctly in sequence, and the third radio signal is a response to the first radio signal and the second radio signal.

In one subembodiment, the first radio signal and the second radio signal together are used for determining the multi-antenna related transmitting of the third radio signal.

In one embodiment, the base station device transmits the third radio signal after a time domain resource occupied by the second radio signal.

According to one aspect of the present disclosure, the above method is characterized in that: at least one of {the first radio signal, the second radio signal} is used for determining the multi-antenna related transmitting of the third radio signal.

According to one aspect of the present disclosure, the above method is characterized in that: the first radio signal and the second radio signal together are used for determining the multi-antenna related transmitting of the third radio signal.

According to one aspect of the present disclosure, the above method is characterized in that: the first channel is a first type of physical layer channel, the second channel is a second type of physical layer channel, and the first type of physical layer channel and the second type of physical layer channel are two different types of physical layer channels.

According to one aspect of the present disclosure, the above method is characterized in that: the first channel is a physical layer control channel.

According to one aspect of the present disclosure, the above method is characterized in that: a time domain resource occupied by the first radio signal is used for determining a second time window, a time domain resource occupied by the second radio signal is within the second time window, and the second time window is within the first time window.

According to one aspect of the present disclosure, the above method is characterized in that: a time domain resource occupied by the second radio signal is used for determining a third time window, and the end time of the third time window is the end time of the first time window.

The present disclosure provides a UE for wireless communication. The UE includes:

a first receiver module, to receive a target radio signal;

a second transmitter module, to transmit a first radio signal on a first channel;

a third transmitter module, to transmit a second radio signal on a second channel; and a fourth receiver module, to monitor a third radio signal in a first time window.

Herein, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the above UE is characterized in that: at least one of {the first radio signal, the second radio signal} is used for determining the multi-antenna related transmitting of the third radio signal.

In one embodiment, the above UE is characterized in that: the first radio signal and the second radio signal together are used for determining the multi-antenna related transmitting of the third radio signal.

In one embodiment, the above UE is characterized in that: the first channel is a first type of physical layer channel, the second channel is a second type of physical layer channel, and the first type of physical layer channel and the second type of physical layer channel are two different types of physical layer channels.

In one embodiment, the above UE is characterized in that: the first channel is a physical layer control channel.

In one embodiment, the above UE is characterized in that: a time domain resource occupied by the first radio signal is used for determining a second time window, a time domain resource occupied by the second radio signal is within the second time window, and the second time window is within the first time window.

In one embodiment, the above UE is characterized in that: a time domain resource occupied by the second radio signal is used for determining a third time window, and the end time of the third time window is the end time of the first time window The present disclosure provides a base station device for wireless communication. The base station device includes:

a first transmitter module, to transmit a target radio signal;

a second receiver module, to receive a first radio signal on a first channel;

a third receiver module, to receive a second radio signal on a second channel; and a fourth transmitter module, to transmit a third radio signal in a first time window.

Herein, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the above base station device is characterized in that: at least one of {the first radio signal, the second radio signal} is used for determining the multi-antenna related transmitting of the third radio signal.

In one embodiment, the above base station device is characterized in that: the first radio signal and the second radio signal together are used for determining the multi-antenna related transmitting of the third radio signal.

In one embodiment, the above base station device is characterized in that: the first channel is a first type of physical layer channel, the second channel is a second type of physical layer channel, and the first type of physical layer channel and the second type of physical layer channel are two different types of physical layer channels.

In one embodiment, the above base station device is characterized in that: the first channel is a physical layer control channel.

In one embodiment, the above base station device is characterized in that: a time domain resource occupied by the first radio signal is used for determining a second time window, a time domain resource occupied by the second radio signal is within the second time window, and the second time window is within the first time window.

In one embodiment, the above base station device is characterized in that: a time domain resource occupied by the second radio signal is used for determining a third time window, and the end time of the third time window is the end time of the first time window.

In one embodiment, compared with the prior art, the present disclosure has the following technical advantages:

the allocated aerial resources are fully utilized, and the utilization of the aerial resources configured to transmit a report request that is determined autonomously by the UE is improved; and the robustness of the request reporting is increased.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if no conflict is caused.

Embodiment 1

Figure 1:
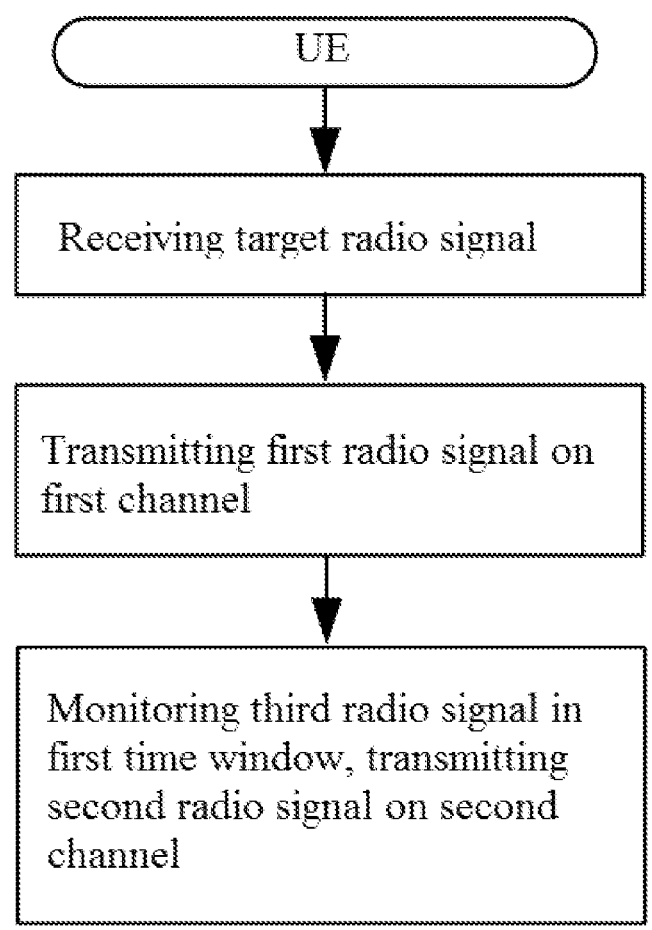
FIG. 1 is a flowchart of a target radio signal, a first radio signal, a second radio signal and a third radio signal according to one embodiment of the present disclosure.

Embodiment 1 illustrates an example of a flowchart of the transmission of a target radio signal, a first radio signal, a second radio signal and a third radio signal according to the present disclosure, as shown in FIG. 1. In FIG. 1, each box represents a step. In Embodiment 1, the UE in the present disclosure receives a target radio signal, transmits a first radio signal on a first channel, monitors a third radio signal in a first time window, and transmits a second radio signal on a second channel, in sequence, wherein a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the target radio signal is used for conducting a channel quality measurement of a physical layer control channel transmitted on a first frequency domain resource.

In one embodiment, the target radio signal is a downlink reference signal used for channel measurement.

In one embodiment, if the result of the channel measurement is less than a target threshold, the transmission of the first radio signal and the second radio signal is triggered.

In one embodiment, the first radio signal and the second radio signal are beam recovery requests.

In one embodiment, an uplink physical layer control channel is used for transmitting the first radio signal.

In one embodiment, a physical layer random access channel is used for transmitting the second radio signal.

In one embodiment, a time domain resource occupied by the second radio signal is within the first time window.

In one embodiment, the second radio signal is used for determining the multi-antenna related transmitting of the third radio signal.

In one embodiment, the first radio signal and the second radio signal together are used for determining the multi-antenna related transmitting of the third radio signal.

In one embodiment, a time domain resource occupied by the second radio signal is used for determining the start time of a third time window. The end time of the third time window and the end time of the first time window are the same. A second time interval refers to a time interval from the start time of the first time window to the start time of the third time window. The first radio signal is related to the multi-antenna related receiving used for monitoring the third radio signal in the second time interval. The second radio signal is related to the multi-antenna related receiving used for monitoring the third radio signal in the third time window.

In one embodiment, the first radio signal is used for determining a second antenna port group, an analog receiving beam used for receiving the second antenna port group is used for monitoring the third radio signal in the second time interval.

In one embodiment, the second radio signal is used for determining a third antenna port group, an analog receiving beam used for receiving the third antenna port group is used for monitoring the third radio signal in the third time window.

In one embodiment, the first radio signal and the second radio signal together are used for determining the third antenna port group.

In one embodiment, the UE does not detect the third radio signal in the second time interval.

In one embodiment, a downlink physical layer control channel is used for transmitting the third radio signal.

Embodiment 2

Figure 2:
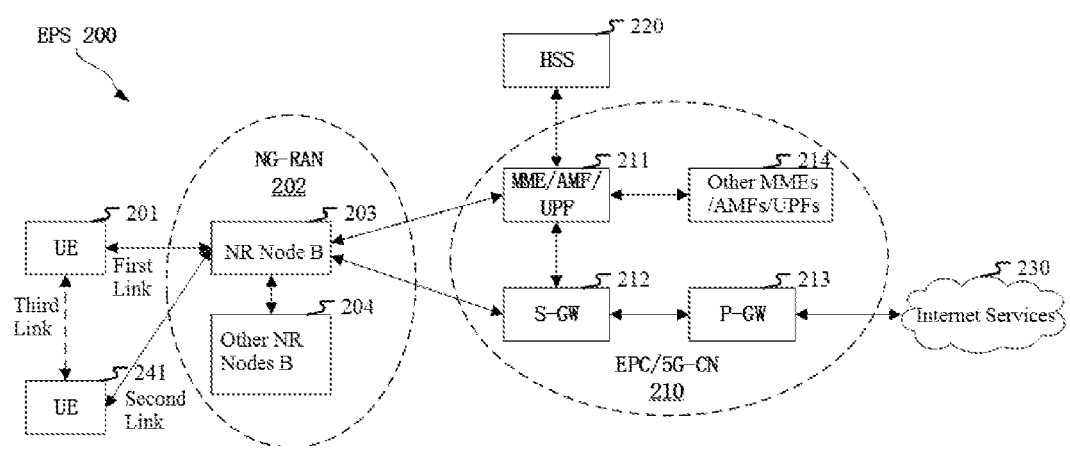
FIG. 2 is a diagram illustrating a network architecture according to one embodiment of the present disclosure.

Embodiment 2 illustrates an example of a diagram of a network architecture according to the present disclosure, as shown in FIG. 2. FIG. 2 is a diagram illustrating a system network architecture 200 of NR 5G Long-Term Evolution (LTE), Long-Term Evolution Advanced (LTE-A). The NR 5G or LTE network architecture 200 may be called an Evolved Packet System (EPS) 200 or some other appropriate terms. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one embodiment, the UE 201 corresponds to the UE in the present disclosure.

In one embodiment, the gNB 203 corresponds to the base station in the present disclosure.

In one embodiment, the UE 201 supports multi-antenna transmission.

In one embodiment, the UE 201 supports analog beamforming.

In one embodiment, the gNB 203 supports multi-antenna transmission.

In one embodiment, the gNB 203 supports analog beamforming.

Embodiment 3

Figure 3:
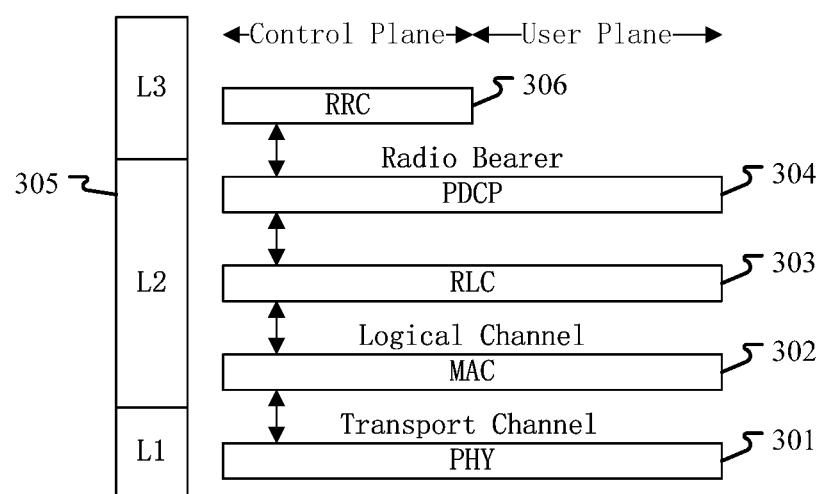
FIG. 3 is a diagram illustrating a radio protocol architecture of a user plane and a control plane according to one embodiment of the present disclosure.

Embodiment 3 illustrates an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of the PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304.

All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station device in the present disclosure.

In one embodiment, the target radio signal in the present disclosure is generated by the PHY 301.

In one embodiment, the first radio signal in the present disclosure is generated by the PHY 301.

In one embodiment, the second radio signal in the present disclosure is generated by the PHY 301.

In one embodiment, the third radio signal in the present disclosure is generated by the PHY 301.

Embodiment 4

Figure 4:
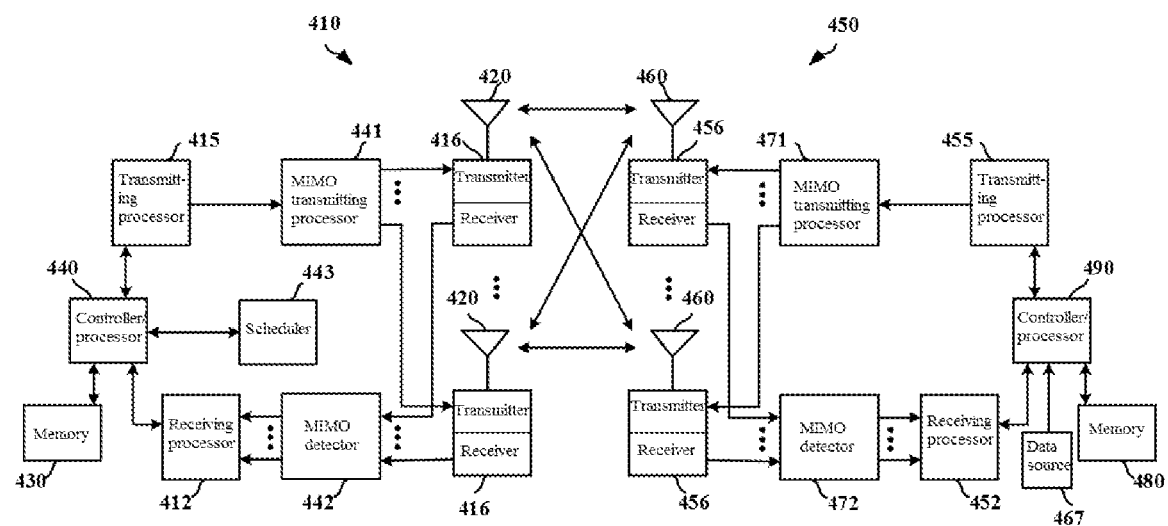
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network.

The base station device 410 may include a controller/processor 440, a scheduler 443, a memory 430, a receiving processor 412, a transmitting processor 415, an MIMO transmitting processor 441, an MIMO detector 442, a transmitter/receiver 416 and an antenna 420.

The UE 450 may include a controller/processor 490, a memory 480, a data source 467, a transmitting processor 455, a receiving processor 452, an MIMO transmitting processor 471, an MIMO detector 472, a transmitter/receiver 456 and an antenna 460.

In Downlink (DL) transmission, processes relevant to the base station device 410 include the following.

A packet from a higher layer is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 may be connected to the memory 430 that stores program code and data. The memory 430 may be a computer readable medium.

The controller/processor 440 notifies the scheduler 443 of a transmission requirement, the scheduler 443 is configured to schedule an aerial resource corresponding to the transmission requirement and notify the scheduling result to the controller/processor 440.

The controller/processor 440 transmits, to the transmitting processor 415, the control information for downlink transmission obtained when the receiving processor 412 processes uplink receiving.

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The MIMO transmitting processor 441 performs spatial processing (for example, multi-antenna precoding, digital beamforming) on data symbols, control symbols or reference signal symbols, and outputs a baseband signal to the transmitter 416.

The MIMO transmitting processor 441 outputs an analog transmitting beamforming vector to the transmitter 416.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal. Analog transmitting beamforming is processed in the transmitter 416.

In DL transmission, processes relevant to the UE 450 include the following.

The receiver 456 is configured to convert a radio-frequency signal received via the antenna 460 into a baseband signal and provide the baseband signal to the MIMO detector 472. Analog receiving beamforming is processed in the receiver 456.

The MIMO detector 472 is configured to perform an MIMO detection on the signal received from the receiver 456, and provide a baseband signal subjected to MIMO detection to the receiving processor 452.

The MIMO detector 472 outputs an analog receiving beamforming vector to the receiver 456.

The receiving processor 452 performs signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 may be connected to the memory 480 that stores program code and data. The memory 480 may be a computer readable medium.

The controller/processor 490 transmits, to the receiving processor 452, the control information for downlink receiving obtained when the transmitting processor 455 processes uplink transmission.

The target radio signal in the present disclosure is generated through the transmitting processor 415. The MIMO transmitting processor 441 performs multi-antenna precoding on a baseband signal related to the target radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the target radio signal, and converts the radio frequency signal into a baseband signal and provides the baseband signal to the MIMO detector 472. The MIMO detector 472 performs an MIMO detection on the signal received from the receiver 456. The receiving processor 452 performs channel measurement on the baseband signal output by the MIMO detector 472.

The third radio signal in the present disclosure is generated through the transmitting processor 415. The MIMO transmitting processor 441 performs multi-antenna precoding on a baseband signal related to the third radio signal output by the transmitting processor 415. The transmitter 416 converts the baseband signal provided by the MIMO transmitting processor 441 into a radio frequency signal, performs analog transmitting beamforming, and transmits the radio frequency signal via the antenna 420. The receiver 456 receives the radio frequency signal via the antenna 460, performs analog receiving beamforming, obtains a radio frequency signal related to the third radio signal, and converts the radio frequency signal into a baseband signal and provides the baseband signal to the MIMO detector 472. The MIMO detector 472 performs an MIMO detection on the signal received from the receiver 456. The receiving processor 452 processes the baseband signal output by the MIMO detector 472 to obtain the third radio signal.

In one embodiment, the receiving processor 412 extracts, from the second radio signal, information about the multi-antenna related transmitting of the third radio signal, and the information is transmitted by the controller/processor 440 to the transmitter 416 via the transmitting processor 415 and the MIMO transmitting processor 441 to perform analog transmitting beamforming for the third radio signal.

In one embodiment, the receiving processor 412 extracts, from the first radio signal and the second radio signal, information about the multi-antenna related transmitting of the third radio signal, and the information is transmitted by the controller/processor 440 to the transmitter 416 via the transmitting processor 415 and the MIMO transmitting processor 441 to perform analog transmitting beamforming for the third radio signal.

In Uplink (UL) transmission, processes relevant to the UE 450 include the following.

The data source 467 provides a packet from a higher layer to the controller/processor 490. The controller/processor 490 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Uplink Shared Channel (UL-SCH).

The controller/processor 490 may be connected to the memory 480 that stores program code and data. The memory 480 may be a computer readable medium.

The controller/processor 490 transmits, to the transmitting processor 455, the control information for uplink transmission obtained when the receiving processor 452 processes downlink receiving.

The transmitting processor 455 receives a bit stream output from the controller/processor 490, and performs signal transmitting processing functions of an L1 layer (that is, PHY), including encoding, interleaving, scrambling, modulation, power control/allocation, generation of physical layer control signaling (including PUCCH, Sounding Reference Signal (SRS)), etc.

The MIMO transmitting processor 471 performs spatial processing (for example, multi-antenna precoding, digital beamforming) on data symbols, control symbols or reference signal symbols, and outputs a baseband signal to the transmitter 456.

The MIMO transmitting processor 471 outputs an analog transmitting beamforming vector to the transmitter 457.

The transmitter 456 is configured to convert the baseband signal provided by the MIMO transmitting processor 471 into a radio-frequency signal and transmit the radio-frequency signal via the antenna 460. Each transmitter 416 performs sampling processing on respective input symbol streams to obtain respective sampled signal streams. Each transmitter 456 performs further processing (for example, digital-to-analogue conversion, amplification, filtering, up conversion, etc.) on respective sampled streams to obtain an uplink signal.

In UL transmission, processes relevant to the base station device 410 include the following.

The receiver 416 is configured to convert a radio-frequency signal received via the antenna 420 into a baseband signal and provide the baseband signal to the MIMO detector 442. Analog receiving beamforming is processed in the receiver 456.

The MIMO detector 442 is configured to perform an MIMO detection on the signal received from the receiver 416, and provide a symbol subjected to MIMO detection to the receiving processor 442.

The MIMO detector 442 outputs an analog receiving beamforming vector to the receiver 416.

The receiving processor 412 performs signal receiving processing functions of an L1 layer (that is, PHY), including decoding, de-interleaving, descrambling, demodulation, extraction of physical layer control signaling, etc.

The controller/processor 440 receives a bit stream output from the receiving processor 412, and provides header decompression, decryption, packet segmentation and reordering, multiplexing and de-multiplexing between a logical channel and a transport channel, to implement the L2 protocol used for the user plane and the control plane.

The controller/processor 440 may be connected to the memory 430 that stores program code and data. The memory 430 may be a computer readable medium.

The controller/processor 440 transmits, to the receiving processor 412, the control information for uplink transmission obtained when the transmitting processor 415 processes downlink transmission.

The first radio signal in the present disclosure is generated through the transmitting processor 455. The MIMO transmitting processor 471 performs multi-antenna precoding on a baseband signal related to the first radio signal output by the transmitting processor 455. The transmitter 456 converts the baseband signal provided by the MIMO transmitting processor 471 into a radio frequency signal, performs analog transmitting beamforming, and transmits the radio frequency signal via the antenna 460. The receiver 416 receives the radio frequency signal via the antenna 420, performs analog receiving beamforming, obtains a radio frequency signal related to the first radio signal, and converts the radio frequency signal into a baseband signal and provides the baseband signal to the MIMO detector 442. The MIMO detector 442 performs an MIMO detection on the signal received from the receiver 416. The receiving processor 412 processes the baseband signal output by the MIMO detector 442 to obtain the first radio signal.

The second radio signal in the present disclosure is generated through the transmitting processor 455. The MIMO transmitting processor 471 performs multi-antenna precoding on a baseband signal related to the second radio signal output by the transmitting processor 455. The transmitter 456 converts the baseband signal provided by the MIMO transmitting processor 471 into a radio frequency signal, performs analog transmitting beamforming, and transmits the radio frequency signal via the antenna 460. The receiver 416 receives the radio frequency signal via the antenna 420, performs analog receiving beamforming, obtains a radio frequency signal related to the second radio signal, and converts the radio frequency signal into a baseband signal and provides the baseband signal to the MIMO detector 442. The MIMO detector 442 performs an MIMO detection on the signal received from the receiver 416. The receiving processor 412 processes the baseband signal output by the MIMO detector 442 to obtain the second radio signal.

In one embodiment, the UE 450 device includes at least one processor and at least one memory. The at least one memory includes computer program codes. The at least one memory and the computer program codes are configured to be used in collaboration with the at least one processor. The UE 450 device at least receives a target radio signal, transmits a first radio signal on a first channel, transmits a second radio signal on a second channel, and monitors a third radio signal in a first time window, wherein a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the UE 450 includes a memory that stores a computer readable instruction program. The computer readable instruction program generates an action when executed by at least one processor. The action includes receiving a target radio signal, transmitting a first radio signal on a first channel, transmitting a second radio signal on a second channel, and monitoring a third radio signal in a first time window, wherein a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the gNB 410 device includes at least one processor and at least one memory. The at least one memory includes computer program codes. The at least one memory and the computer program codes are configured to be used in collaboration with the at least one processor. The gNB 410 at least transmits a target radio signal, receives a first radio signal on a first channel, receives a second radio signal on a second channel, and transmits a third radio signal in a first time window, wherein a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the gNB 410 includes a memory that stores a computer readable instruction program. The computer readable instruction program generates an action when executed by at least one processor. The action includes transmitting a target radio signal, receiving a first radio signal on a first channel, receiving a second radio signal on a second channel, and transmitting a third radio signal in a first time window, wherein a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one embodiment, the UE 450 corresponds to the UE in the present disclosure.

In one embodiment, the gNB 410 corresponds to the base station in the present disclosure.

In one embodiment, the transmitting processor 415, the MIMO transmitter 441, and the transmitter 416 are used for transmitting the target radio signal in the present disclosure.

In one embodiment, the receiver 456, the MIMO detector 472, and the receiving processor 452 are used for receiving the target radio signal in the present disclosure.

In one embodiment, the transmitting processor 455, the MIMO transmitter 471, and the transmitter 456 are used for transmitting the first radio signal in the present disclosure.

In one embodiment, the receiver 416, the MIMO detector 442, and the receiving processor 412 are used for receiving the first radio signal in the present disclosure.

In one embodiment, the transmitting processor 455, the MIMO transmitter 471, and the transmitter 456 are used for transmitting the second radio signal in the present disclosure.

In one embodiment, the receiver 416, the MIMO detector 442, and the receiving processor 412 are used for receiving the second radio signal in the present disclosure.

In one subembodiment, the transmitting processor 415, the MIMO transmitter 441, and the transmitter 416 are used for transmitting the third radio signal in the present disclosure.

In one subembodiment, the receiver 456, the MIMO detector 472, and the receiving processor 452 are used for receiving the third radio signal in the present disclosure.

Embodiment 5

Figure 5:
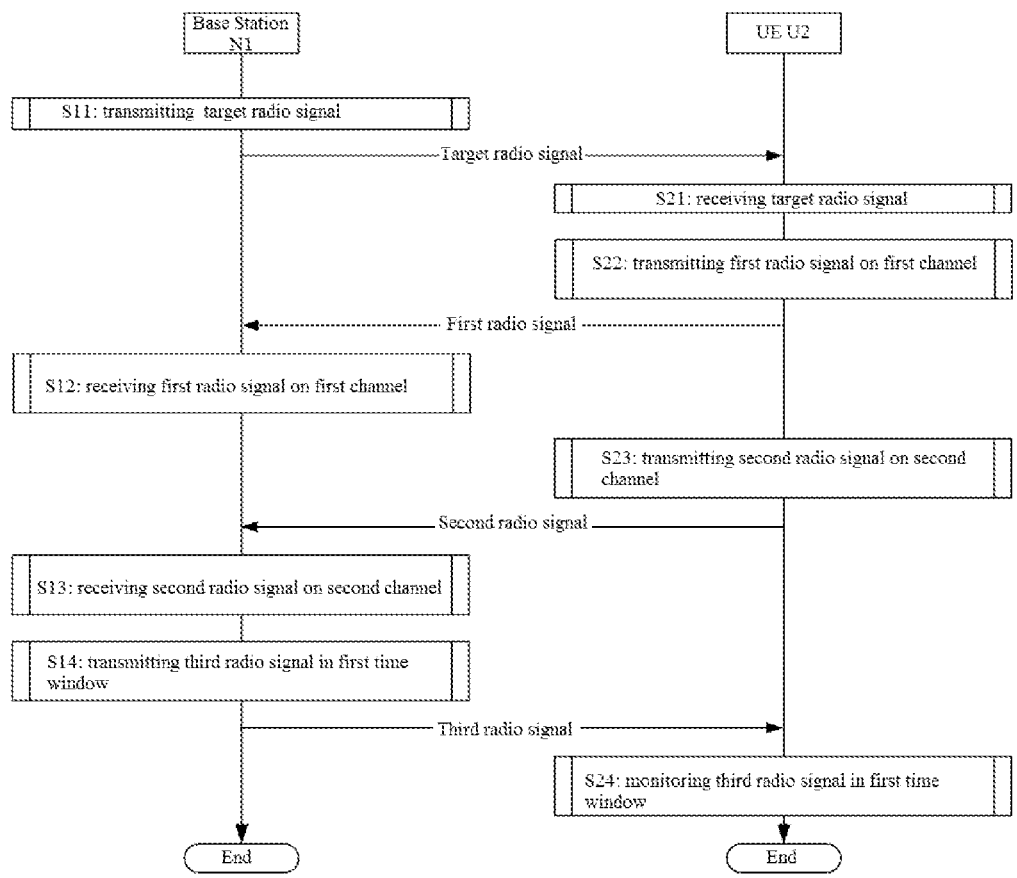
FIG. 5 is a flowchart illustrating the transmission of a radio signal according to one embodiment of the present disclosure.

Embodiment 5 illustrates an example of a flowchart of the transmission of a radio signal according to the present disclosure, as shown in FIG. 5. In FIG. 5, the base station N1 is a maintenance base station for a serving cell of the UE U2.

The base station N1 transmits a target radio signal in S11, receives a first radio signal on a first channel in S12, receives a second radio signal on a second channel in S13, and transmits a third radio signal in a first time window in S14.

The UE U2 receives the target radio signal in S21, transmits the first radio signal on the first channel in S22, transmits the second radio signal on the second channel in S23, and monitors the third radio signal in the first time window in S24.

In Embodiment 5, a measurement for the target radio signal is used by the U2 to trigger the transmission of the first radio signal and the second radio signal; a time resource occupied by the first radio signal is used by the N1 and U2 to determine the start time of the first time window; and a time resource occupied by the second radio signal is used by the N1 and U2 to determine the end time of the first time window.

In one subembodiment, at least one of {the first radio signal, the second radio signal} is used by the N1 to determine the multi-antenna related transmitting of the third radio signal.

In one subembodiment, the first radio signal and the second radio signal together are used by the N1 to determine the multi-antenna related transmitting of the third radio signal.

In one subembodiment, the first channel is a first type of physical layer channel, the second channel is a second type of physical layer channel, and the first type of physical layer channel and the second type of physical layer channel are two different types of physical layer channels.

In one subembodiment, the first channel is a physical layer control channel.

In one subembodiment, a time domain resource occupied by the first radio signal is used by the N1 and U2 to determine a second time window, a time domain resource occupied by the second radio signal is within the second time window, and the second time window is within the first time window.

In one subembodiment, a time domain resource occupied by the second radio signal is used by the N1 and U2 to determine a third time window, and the end time of the third time window is the end time of the first time window.

If no conflict is caused, the above subembodiments can be arbitrarily combined.

Embodiment 6

Figure 6:
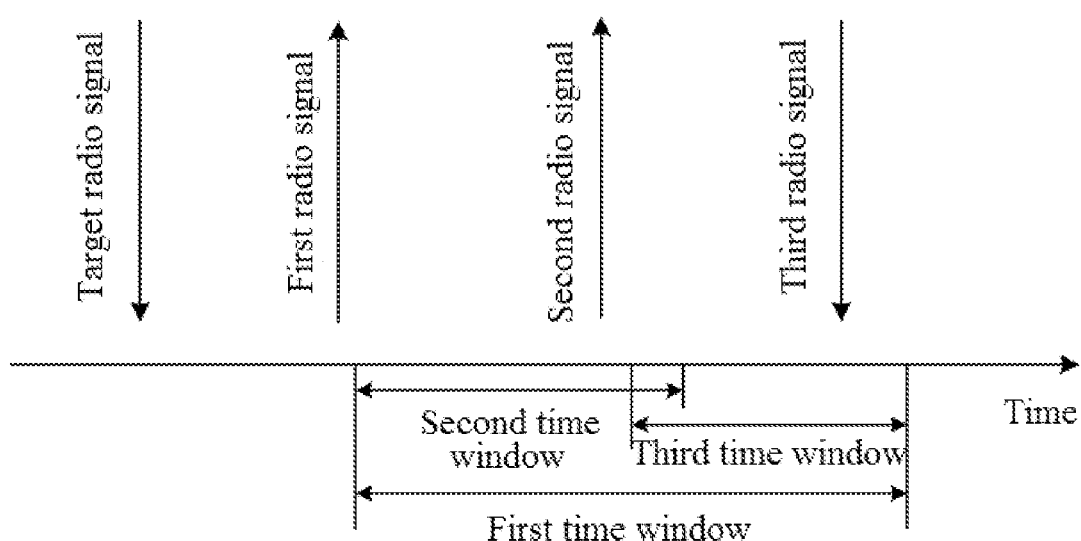
FIG. 6 is a diagram illustrating a first time window, a second time window and a third time window according to one embodiment of the present disclosure.

Embodiment 6 illustrates an example of a first time window, a second time window and a third time window, as shown in FIG. 6.

In Embodiment 6, a time domain resource occupied by a first radio signal is used for determining the start time of a second time window, and a time domain resource occupied by a second radio signal is used for determining the start time of a third time window. The start time of the first time window and the start time of the second time window are the same. The time domain resource occupied by the second radio signal is within the second time window. The end time of the first time window and the end time of the third time window are the same. The UE conducts monitoring of the third radio signal in a time interval between the start time of the first time window and the time domain resource occupied by the second radio signal, but does not detect the third radio signal. The third radio signal is transmitted after the second radio signal.

In one subembodiment, the base station does not transmit the third radio signal in the time interval between the start time of the first time window and the time domain resource occupied by the second radio signal.

In one subembodiment, the second radio signal is used for determining a second antenna port group, an analog transmitting beam used for forming the second antenna port group is used for transmitting the third radio signal in the third time window.

In one subembodiment, an analog receiving beam used for receiving the second antenna port group is used for monitoring the third radio signal in the third time window.

In one subembodiment, the first radio signal is used for determining a first antenna port group, an analog receiving beam used for receiving the first antenna port group is used for monitoring the third radio signal in a time interval between the start time of the first time window and the start time of the third time window.

In one subembodiment, a time domain resource occupied by the first radio signal is the start time of the second time window.

In one subembodiment, the start time of the second time window is equal to the time domain resource occupied by the first radio signal plus an offset.

In one subembodiment, a time domain resource occupied by the second radio signal is the start time of the third time window.

In one subembodiment, the start time of the third time window is equal to the time domain resource occupied by the second radio signal plus an offset.

Embodiment 7

Figure 7:
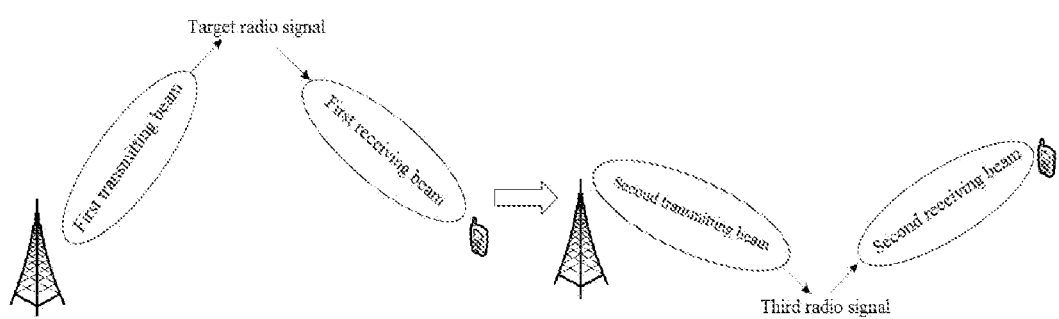
FIG. 7 is a diagram illustrating the multi-antenna related transmitting and receiving of a target radio signal and a third radio signal according to one embodiment of the present disclosure.

Embodiment 7 illustrates an example of the multi-antenna related transmitting and receiving of a target radio signal and a third radio signal, as shown in FIG. 7.

In Embodiment 7, a first transmitting beam is used for transmitting a target radio signal, and a first receiving beam is used for receiving the target radio signal; a second transmitting beam is used for transmitting a third radio signal, and a second receiving beam is used for receiving the third radio signal. The transmitting direction of the first transmitting beam is different from that of the second transmitting beam, and the receiving direction of the first receiving beam is different from that of the second receiving beam.

In one subembodiment, the transmitting beam is an analog transmitting beam, and the receiving beam is an analog receiving beam.

In one subembodiment, an analog beamforming vector is applied to a phase shifter of a radio frequency circuit to generate an analog beam.

In one subembodiment, the UE conducts a channel measurement of the target radio signal, and the result of the channel measurement is less than a target threshold; the UE transmits a first radio signal, and the first radio signal is used for determining the second transmitting beam; and the UE monitors the third radio signal using the second receiving beam.

Embodiment 8

Figure 8:
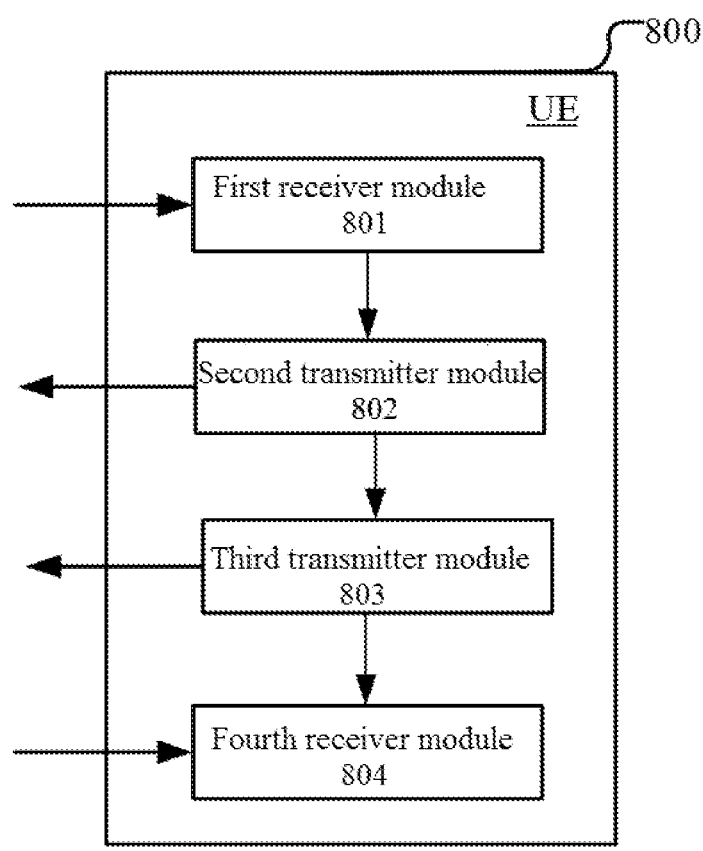
FIG. 8 is a structure block diagram illustrating a processing device in a UE according to one embodiment of the present disclosure.

Embodiment 8 illustrates an example of a structure block diagram of a processing device in a UE, as shown in FIG. 8. In FIG. 8, the processing device 800 of the UE is mainly composed of a first receiver module 801, a second transmitter module 802, a third transmitter module 803, and a fourth receiver module 804.

In Embodiment 8, the first receiver module 801 receives a target radio signal, the second transmitter module 802 transmits a first radio signal on a first channel, the third transmitter module 803 transmits a second radio signal on a second channel, and the fourth receiver module 804 monitors a third radio signal in a first time window.

In Embodiment 8, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one subembodiment, at least one of {the first radio signal, the second radio signal} is used for determining the multi-antenna related transmitting of the third radio signal.

In one subembodiment, the first radio signal and the second radio signal together are used for determining the multi-antenna related transmitting of the third radio signal.

In one subembodiment, the first channel is a first type of physical layer channel, the second channel is a second type of physical layer channel, and the first type of physical layer channel and the second type of physical layer channel are two different types of physical layer channels.

In one subembodiment, the first channel is a physical layer control channel.

In one subembodiment, a time domain resource occupied by the first radio signal is used for determining a second time window, a time domain resource occupied by the second radio signal is within the second time window, and the second time window is within the first time window In one subembodiment, a time domain resource occupied by the second radio signal is used for determining a third time window, and the end time of the third time window is the end time of the first time window.

Embodiment 9

Figure 9:
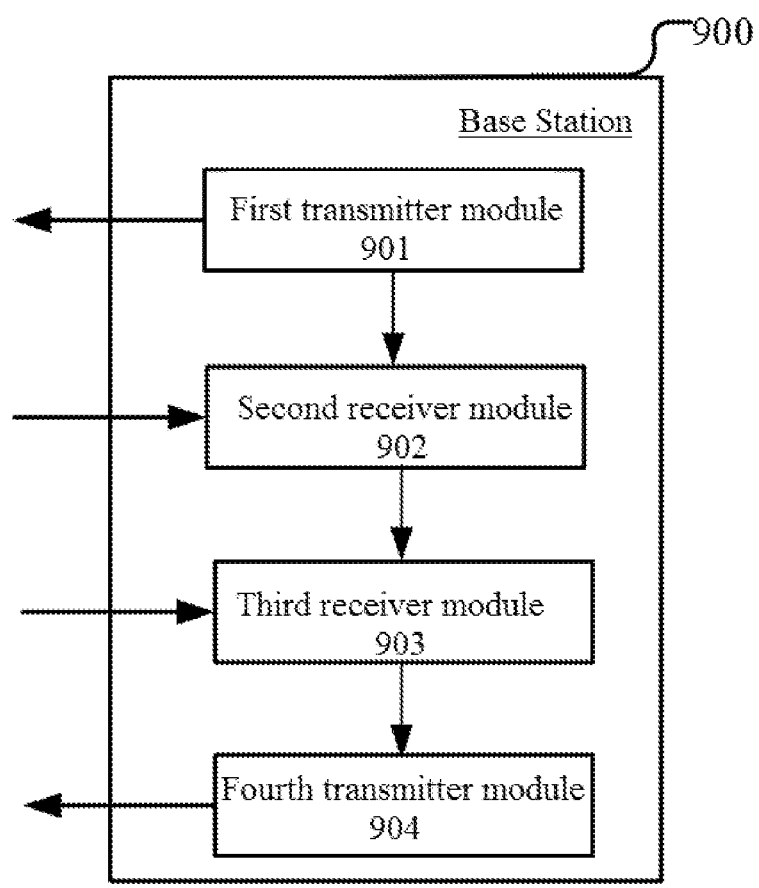
FIG. 9 is a structure block diagram illustrating a processing device in a base station according to one embodiment of the present disclosure.

Embodiment 9 illustrates an example of a structure block diagram of a processing device in a base station, as shown in FIG. 9. In FIG. 9, the processing device 900 of the base station is mainly composed of a first transmitter module 901, a second receiver module 902, a third receiver module 903, and a fourth transmitter module 904.

In Embodiment 9, the first transmitter module 901 transmits a target radio signal, the second receiver module 902 receives a first radio signal on a first channel, the third receiver module 903 receives a second radio signal on a second channel, and the fourth transmitter module 904 transmits a third radio signal in a first time window.

In Embodiment 9, a measurement for the target radio signal is used for triggering the transmission of the first radio signal and the second radio signal; a time resource occupied by the first radio signal is used for determining the start time of the first time window; and a time resource occupied by the second radio signal is used for determining the end time of the first time window.

In one subembodiment, at least one of {the first radio signal, the second radio signal} is used for determining the multi-antenna related transmitting of the third radio signal.

In one subembodiment, the first radio signal and the second radio signal together are used for determining the multi-antenna related transmitting of the third radio signal.

In one subembodiment, the first channel is a first type of physical layer channel, the second channel is a second type of physical layer channel, and the first type of physical layer channel and the second type of physical layer channel are two different types of physical layer channels.

In one subembodiment, the first channel is a physical layer control channel.

In one subembodiment, a time domain resource occupied by the first radio signal is used for determining a second time window, a time domain resource occupied by the second radio signal is within the second time window, and the second time window is within the first time window.

In one subembodiment, a time domain resource occupied by the second radio signal is used for determining a third time window, and the end time of the third time window is the end time of the first time window.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station and radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a target radio signal;
   transmitting a first radio signal on a first channel;
   transmitting a second radio signal on a second channel; and
   monitoring a third radio signal in a first time window;
   wherein a measurement for the target radio signal obtains a target measurement value, the target measurement value, when higher than a target threshold is used for triggering the transmission of the first radio signal and the second radio signal; a time resource occupied by the first radio signal is used for determining the start time of the first time window; a time domain resource occupied by the first radio signal is used for determining a second time window, a time domain resource occupied by the second radio signal is within the second time window, and the second time window is within the first time window; a time domain resource occupied by the second radio signal is used for determining a third time window, and the end time of the third time window is the end time of the first time window; and the second time window and the third time window have overlapped time domain resource(s).

2. The method according to claim 1, wherein at least one signal of the following set of signals: {the first radio signal, the second radio signal} is used for determining a multi-antenna related transmitting of the third radio signal; or, the first radio signal and the second radio signal together are used for determining the multi-antenna related transmitting of the third radio signal.

3. The method according to claim 1, wherein the first channel is a first type of physical layer channel, the second channel is a second type of physical layer channel, and the first type of physical layer channel and the second type of physical layer channel are two different types of physical layer channels.

4. The method according to claim 1, wherein the first channel is a physical layer control channel.

5. The method according to claim 1, wherein the first radio signal is used for determining a first antenna port group, and the first antenna port group is spatially related to an antenna port group used for transmitting the third radio signal, the being spatially related refers to being Quasi Co-Located ("QCL"); or, the first time window is divided into a second time interval and a third time interval, the second time interval is before the third time interval, the third time interval is behind a time domain resource occupied by the second radio signal, the first radio signal is used for determining a second antenna port group, in the second time interval, the second antenna port group is spatially QCL with an antenna port group used for transmitting the third radio signal in the second time interval, the second radio signal is used for determining a third antenna port group; in the third time interval, the third antenna port group is spatially QCL with an antenna port group used for transmitting the third radio signal in the third time interval.

6. A method in a base station device for wireless communication, comprising:
   transmitting a target radio signal;
   receiving a first radio signal on a first channel;
   receiving a second radio signal on a second channel; and
   transmitting a third radio signal in a first time window;
   wherein a measurement for the target radio signal obtains a target measurement value, the target measurement value, when higher than a target threshold, is used for triggering the transmission of the first radio signal and the second radio signal; a time resource occupied by the first radio signal is used for determining the start time of the first time window; a time domain resource occupied by the first radio signal is used for determining a second time window, a time domain resource occupied by the second radio signal is within the second time window, and the second time window is within the first time window; a time domain resource occupied by the second radio signal is used for determining a third time window, and the end time of the third time window is the end time of the first time window; and the second time window and the third time window have overlapped time domain resource(s).

7. The method according to claim 6, wherein at least one signal of the following set of signals: {the first radio signal, the second radio signal} is used for determining a multi-antenna related transmitting of the third radio signal; or, the first radio signal and the second radio signal together are used for determining the multi-antenna related transmitting of the third radio signal.

8. The method according to claim 6, wherein the first channel is a first type of physical layer channel, the second channel is a second type of physical layer channel, and the first type of physical layer channel and the second type of physical layer channel are two different types of physical layer channels.

9. The method according to claim 6, wherein the first channel is a physical layer control channel.

10. The method according to claim 6, wherein the first radio signal is used for determining a first antenna port group, and the first antenna port group is spatially related to an antenna port group used for transmitting the third radio signal, the being spatially related refers to being Quasi Co-Located ("QCL"); or, the first time window is divided into a second time interval and a third time interval, the second time interval is before the third time interval, the third time interval is behind a time domain resource occupied by the second radio signal, the first radio signal is used for determining a second antenna port group, in the second time interval, the second antenna port group is spatially QCL with an antenna port group used for transmitting the third radio signal in the second time interval, the second radio signal is used for determining a third antenna port group; in the third time interval, the third antenna port group is spatially QCL with an antenna port group used for transmitting the third radio signal in the third time interval.

11. A UE for wireless communication, comprising:
a first receiver module, to receive a target radio signal;
a second transmitter module, to transmit a first radio signal on a first channel;
a third transmitter module, to transmit a second radio signal on a second channel; and
a fourth receiver module, to monitor a third radio signal in a first time window;
wherein a measurement for the target radio signal obtains a target measurement value, the target measurement value, when higher than a target threshold, is used for triggering the transmission of the first radio signal and the second radio signal; a time resource occupied by the first radio signal is used for determining the start time of the first time window; a time domain resource occupied by the first radio signal is used for determining a second time window, a time domain resource occupied by the second radio signal is within the second time window, and the second time window is within the first time window; a time domain resource occupied by the second radio signal is used for determining a third time window, and the end time of the third time window is the end time of the first time window; and the second time window and the third time window have overlapped time domain resource(s).

12. The UE according to claim 11, wherein at least one signal of the following set of signals: {the first radio signal, the second radio signal} is used for determining a multi-antenna related transmitting of the third radio signal; or, the first radio signal and the second radio signal together are used for determining the multi-antenna related transmitting of the third radio signal.

13. The UE according to claim 11, wherein the first channel is a first type of physical layer channel, the second channel is a second type of physical layer channel, and the first type of physical layer channel and the second type of physical layer channel are two different types of physical layer channels.

14. The UE according to claim 11, wherein the first channel is a physical layer control channel.

15. The UE according to claim 11, wherein the first radio signal is used for determining a first antenna port group, and the first antenna port group is spatially related to an antenna port group used for transmitting the third radio signal, the being spatially related refers to being Quasi Co-Located ("QCL"); or, the first time window is divided into a second time interval and a third time interval, the second time interval is before the third time interval, the third time interval is behind a time domain resource occupied by the second radio signal, the first radio signal is used for determining a second antenna port group, in the second time interval, the second antenna port group is spatially QCL with an antenna port group used for transmitting the third radio signal in the second time interval, the second radio signal is used for determining a third antenna port group; in the third time interval, the third antenna port group is spatially QCL with an antenna port group used for transmitting the third radio signal in the third time interval.

16. A base station device for wireless communication, comprising:
a first transmitter module, to transmit a target radio signal;
a second receiver module, to receive a first radio signal on a first channel;
a third receiver module, to receive a second radio signal on a second channel; and
a fourth transmitter module, to transmit a third radio signal in a first time window;
wherein a measurement for the target radio signal obtains a target measurement value, the target measurement value, when higher than a target threshold, is used for triggering the transmission of the first radio signal and the second radio signal; a time resource occupied by the first radio signal is used for determining the start time of the first time window; a time domain resource occupied by the first radio signal is used for determining a second time window, a time domain resource occupied by the second radio signal is within the second time window, and the second time window is within the first time window; a time domain resource occupied by the second radio signal is used for determining a third time window, and the end time of the third time window is the end time of the first time window; and the second time window and the third time window have overlapped time domain resource(s).

17. The base station device according to claim 16, wherein at least one signal of the following set of signals: {the first radio signal, the second radio signal} is used for determining a multi-antenna related transmitting of the third radio signal; or, the first radio signal and the second radio signal together are used for determining the multi-antenna related transmitting of the third radio signal.

18. The base station device according to claim 16, wherein the first channel is a first type of physical layer channel, the second channel is a second type of physical layer channel, and the first type of physical layer channel and the second type of physical layer channel are two different types of physical layer channels.

19. The base station device according to claim 16, wherein the first channel is a physical layer control channel.

20. The base station device according to claim 16, wherein the first radio signal is used for determining a first antenna port group, and the first antenna port group is spatially related to an antenna port group used for transmitting the third radio signal, the being spatially related refers to being QCL; or, the first time window is divided into a second time interval and a third time interval, the second time interval is before the third time interval, the third time interval is behind a time domain resource occupied by the second radio signal, the first radio signal is used for determining a second antenna port group, in the second time interval, the second antenna port group is spatially QCL with an antenna port group used for transmitting the third radio signal in the second time interval, the second radio signal is used for determining a third antenna port group; in the third time interval, the third antenna port group is spatially QCL with an antenna port group used for transmitting the third radio signal in the third time interval.

* * * * *